(12) United States Patent
Tian et al.

(10) Patent No.: US 10,655,983 B2
(45) Date of Patent: May 19, 2020

(54) METHOD FOR CALIBRATING AIRCRAFT TRI-AXIAL BALANCE AND DEVICE THEREOF

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 322 days.

(21) Appl. No.: 15/854,793

(22) Filed: Dec. 27, 2017

(65) Prior Publication Data

US 2018/0136009 A1 May 17, 2018

(30) Foreign Application Priority Data

Dec. 30, 2016 (CN) .......................... 2016 1 1270279

(51) Int. Cl.
- *B64C 39/02* (2006.01)
- *G01C 25/00* (2006.01)
- *G01C 21/08* (2006.01)
- *G01C 17/38* (2006.01)

(52) U.S. Cl.
CPC ............ *G01C 25/00* (2013.01); *B64C 39/024* (2013.01); *B64C 39/028* (2013.01); *G01C 17/38* (2013.01); *G01C 21/08* (2013.01); *B64C 2201/141* (2013.01)

(58) Field of Classification Search
CPC ........ G01C 25/00; G01C 17/38; G01C 21/08; B64C 39/024; B64C 39/028; B64C 2201/141

USPC ........................................................ 701/33.1
See application file for complete search history.

(56) References Cited

U.S. PATENT DOCUMENTS

| 2,761,306 | A | * | 9/1956 | McNutt | G01C 25/005 73/1.78 |
| 3,484,167 | A | * | 12/1969 | Burns, Jr. | G01S 13/9303 356/5.08 |
| 5,440,484 | A | * | 8/1995 | Kao | G01C 17/38 33/356 |
| 7,237,343 | B2 | * | 7/2007 | Sato | G01C 17/38 33/356 |

* cited by examiner

*Primary Examiner* — Gertrude Arthur Jeanglaude

(57) ABSTRACT

A method for calibrating aircraft tri-axial balance include steps of: receiving a first indicator signal; tumbling an aircraft by 360 degrees by specified times according to the first indicator signal; collecting and recording first geomagnetic data; receiving a second indicator signal; rotating the aircraft laterally by 360 degrees by the specified times according to the second indicator signal; collecting and recording second geomagnetic data; receiving a third indicator signal; rotating the aircraft horizontally by 360 degrees by the specified times according to the third indicator signal; collecting and recording third geomagnetic data; and obtaining a calibrated geomagnetic curve according to the first geomagnetic data, the second geomagnetic data and the third geomagnetic data. The method and the device for calibrating the aircraft tri-axial balance according to an embodiment of the present invention are able to fully calibrate geomagnetic sensors of the aircraft and better eliminate interference of the geomagnetic sensors.

10 Claims, 3 Drawing Sheets

METHOD FOR CALIBRATING AIRCRAFT TRI-AXIAL BALANCE AND DEVICE THEREOF

CROSS REFERENCE OF RELATED APPLICATION

The present invention claims priority under 35 U.S.C. 119(a-d) to CN 201611270279.0, filed Dec. 30, 2016.

BACKGROUND OF THE PRESENT INVENTION

Field of Invention

The present invention relates to technical field of micro aircraft, and more particularly to a method for calibrating aircraft tri-axial balance and a device thereof.

Description of Related Arts

In recent years, micro aircraft (hereinafter referred to as "aircraft") technologies have made rapid progress. Aircraft have been widely used in industry, agriculture, military and other industries.

The aircraft's inertial measurement unit (IMU) is a device that measures the tri-axial attitude (or angular velocity) and acceleration of an object. Generally, an inertial measurement unit includes three uni-axial accelerometers and three uni-axial gyroscopes. The accelerometer detects the acceleration signals of three independent axes of the object in a carrier coordinate system. The gyroscope detects the angular velocity signal of the carrier relative to the navigation coordinate system, and measures the angular velocity and acceleration of the object in a three-dimensional space, so as to calculate the attitude of the object.

Inertial measurement unit has a very important value in aircraft flight. The use of tri-axial geomagnetic decoupling and tri-axial accelerometer will be greatly affected by external acceleration, so in movement/vibration and other environments, output angle error is large. Furthermore, the shortcoming of the geomagnetic sensor is that an absolute reference is the magnetic field lines of the Earth magnetic field which covers a large range. Due to the variability of the Earth magnetic field, the irregularity of the near-field magnetic field, and great influence of the near-field magnetic field on the magnetic compass of the aircraft when the small-scale aircraft flies in the ultra-low-altitude airspace, for flying in different regions, it is necessary to recalibrate the on-board magnetic compass according to a new field as the field changes, so that the inertial measurement unit can recalculate and calibrate the new geomagnetic curve.

SUMMARY OF THE PRESENT INVENTION

Conventionally, a commonly used method for geomagnetic calibration is to rotate an aircraft horizontally by 360 degrees and then rotate the aircraft horizontally by 360 degrees with a head thereof facing downwards. Then a data curve is fitted to obtain calibration parameters, so that the aircraft can correct geomagnetic data according to the calibration parameters in real time after takeoff. However, the method does not rotate the aircraft in all angles, resulting in inaccurate data fitting results. In view of this, the present invention provides a method for calibrating aircraft tri-axial balance and a device thereof.

The present invention provides a method for calibrating aircraft tri-axial balance, comprising steps of: receiving a first indicator signal; tumbling an aircraft by 360 degrees by specified times according to the first indicator signal; collecting and recording first geomagnetic data; receiving a second indicator signal; rotating the aircraft laterally by 360 degrees by the specified times according to the second indicator signal; collecting and recording second geomagnetic data; receiving a third indicator signal; rotating the aircraft horizontally by 360 degrees by the specified times according to the third indicator signal; collecting and recording third geomagnetic data; and obtaining a calibrated geomagnetic curve according to the first geomagnetic data, the second geomagnetic data and the third geomagnetic data.

Preferably, obtaining the calibrated geomagnetic curve comprises a step of fitting the first geomagnetic data, the second geomagnetic data and the third geomagnetic data by an ellipsoid fitting method.

Preferably, the specified times are no less than twice for obtaining more accurate geomagnetic data.

Preferably, the geomagnetic data comprises a maximum magnetic field intensity and a minimum magnetic field intensity along a corresponding direction.

Preferably, the indicator signal comprises a light signal, a voice prompt, or a text prompt.

The present invention also provides a device for calibrating aircraft tri-axial balance, for calibration of aircraft balance. The device comprises: a first receiving module for receiving a first indicator signal; a first rotating module for tumbling an aircraft by 360 degrees by specified times according to the first indicator signal; a first acquisition module for collecting and recording first geomagnetic data; a second receiving module for receiving a second indicator signal; a second rotating module for rotating the aircraft laterally by 360 degrees by the specified times according to the second indicator signal; a second acquisition module for collecting and recording second geomagnetic data; a third receiving module for receiving a third indicator signal; a third rotating module for rotating the aircraft horizontally by 360 degrees by the specified times according to the third indicator signal; a third acquisition module for collecting and recording third geomagnetic data; and a computing module for obtaining a calibrated geomagnetic curve according to the first geomagnetic data, the second geomagnetic data and the third geomagnetic data.

The present invention also provides a device for calibrating aircraft tri-axial balance, comprising: a processor; and a storage with instructions to be executed by the processor; wherein the instructions to be executed by the processor comprises: receiving a first indicator signal; tumbling an aircraft by 360 degrees by specified times according to the first indicator signal; collecting and recording first geomagnetic data; receiving a second indicator signal; rotating the aircraft laterally by 360 degrees by the specified times according to the second indicator signal; collecting and recording second geomagnetic data; receiving a third indicator signal; rotating the aircraft horizontally by 360 degrees by the specified times according to the third indicator signal; collecting and recording third geomagnetic data; and obtaining a calibrated geomagnetic curve according to the first geomagnetic data, the second geomagnetic data and the third geomagnetic data.

The method and the device for calibrating the aircraft tri-axial balance according to an embodiment of the present invention are able to fully calibrate geomagnetic sensors of the aircraft and better eliminate interference of the geomagnetic sensors during flight of the aircraft, making the flight of the aircraft more stable.

BRIEF DESCRIPTION OF THE DRAWINGS

In the following, features, advantages and technical effects of embodiments of the present invention will be described with reference to the accompanying drawings, in which same reference numerals denote same elements.

DETAILED DESCRIPTION OF THE PREFERRED EMBODIMENT

The features and embodiments of the various aspects of the present invention are described in detail below. In the following detailed description, numerous specific details are set forth in order to provide a thorough understanding of the present invention. However, it will be apparent to one skilled in the art that the present invention may be practiced without some of these specific details. The following description of the embodiments is merely for providing a better understanding of the present invention by showing examples of the present invention. The present invention is not limited to any of the specific configurations and algorithms set forth below, but covers any alterations, substitutions and improvements of the elements, components and algorithms without departing from the spirit of the present invention.

References herein to "one embodiment," "an embodiment," "an illustrative embodiment," "the embodiments," etc., indicate that the embodiment(s) described may include a particular feature, structure, or characteristic, but not every embodiment necessarily includes the particular feature, structure, or characteristic. Furthermore, the repeated use of the phrase "in the embodiment" does not necessarily refer to the same embodiment, although it may refer to the same embodiment.

Figure 1:
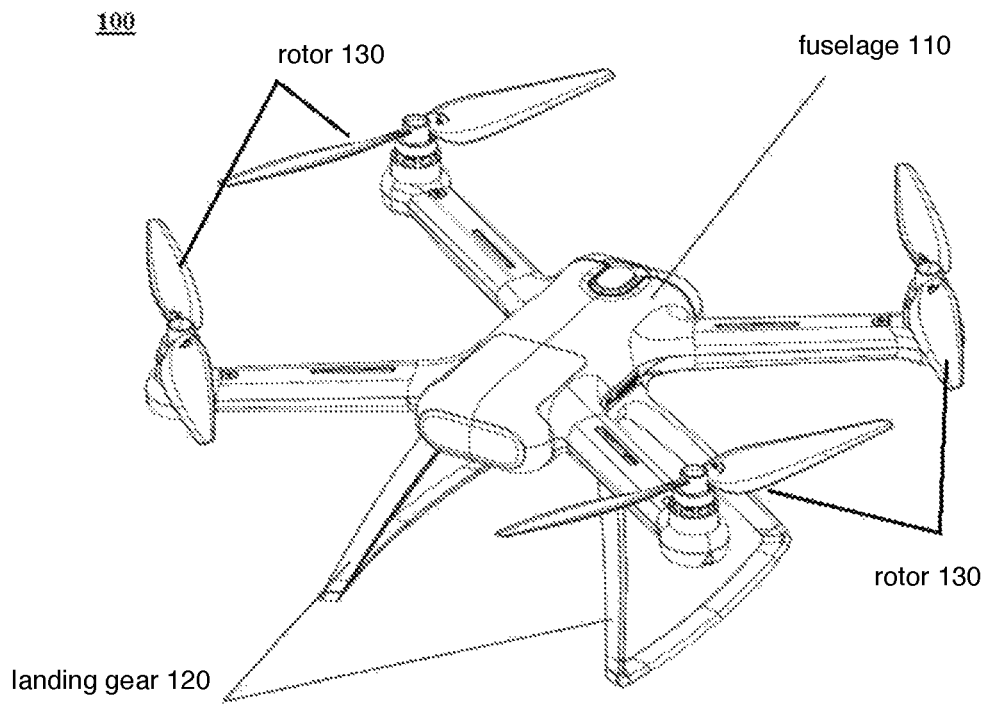
FIG. 1 is a structure diagram of a conventional quadrotor.

Referring to FIG. 1, a structure diagram of a conventional quadrotor 100 is shown in FIG. 1. In simple terms, the quadrotor 100 generally includes at least a fuselage 110, a landing gear 120, and rotors 130 in appearance. In an embodiment shown in FIG. 1, the quadrotor 100 includes four rotors 130. However, in other embodiments, the number of the rotors 130 may be one, two, or more according to actual needs. In addition, what is shown in FIG. 1 is a basic structure of an aircraft. Depending on the field of application, the aircraft may also include other components. For example, an aircraft for photographing further includes a photographing device or a device for accommodating a photographing device. Agricultural production aircraft also includes devices for containing and spraying fertilizers, pesticides and the like; an emerging wrecked UAV may be equipped with small lasers and the like.

Figure 2:
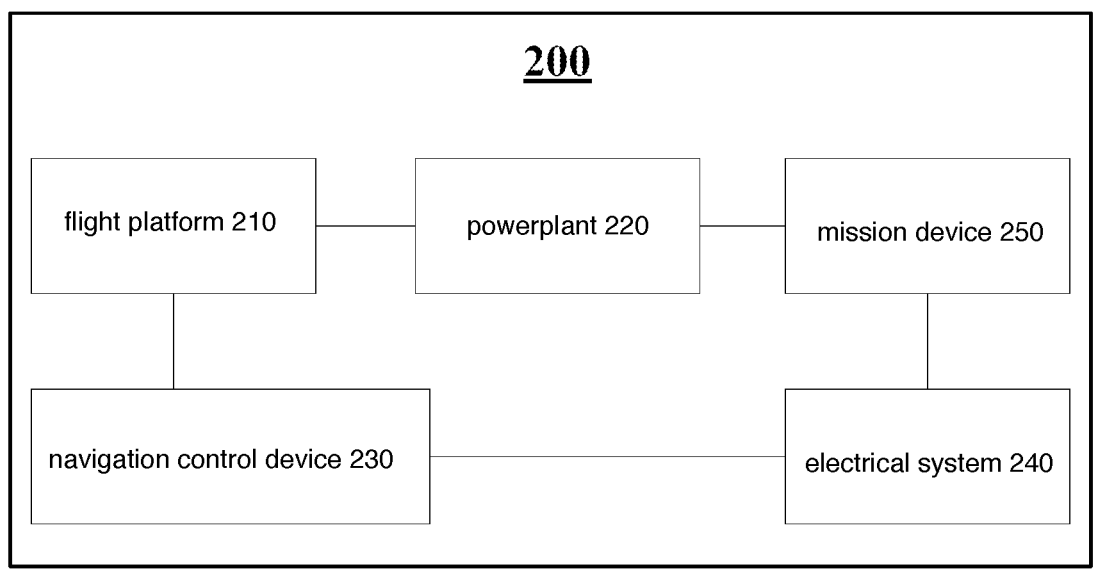
FIG. 2 is a functional block diagram of an aircraft according to an embodiment of the present invention.

FIG. 1 depicts the aircraft from an external structure. FIG. 2 generally shows an internal functional block diagram of an aircraft 200. The aircraft 200 generally includes a flight platform 210, a powerplant 220, a navigation control device 230, an electrical system 240, a mission device 250, and the like. The components communicate with each other for coordinated operation.

The flight platform 210 is used to ensure aircraft flight.

The powerplant 220 produces thrust or tension required for aircraft advancement. Lift is produced by an airfoil such as a rotor. Conventionally, for consideration of cost and convenience, a micro aircraft usually adopts an electric power system. The electric power system mainly comprises a power motor, a power supply, and a speed control system.

The navigation control device 230 provides the aircraft with position, speed, and flight attitude information relative to a selected reference coordinate system to guide the aircraft to fly safely, on time and accurately along a designated route. Therefore, the navigation control device 230 is the key for the aircraft to accomplish the designated task. The navigation control device 230 generally includes a hardware interface driver module, a sensor data processing module, a flight control module, a navigation and guidance module, a flight mission management module, a mission device management module, a redundancy management module, a data transmission recording module, a self-inspection module, and so on. The navigation control device 230 typically uses a variety of sensors for data acquisition including but not limited to geomagnetic sensors (i.e. magnetic compass), angular rate sensors (i.e. gyroscopes), attitude sensors, position sensors, angle sensor, acceleration sensors, height sensors and airspeed sensors.

The electrical system 240 generally includes a power supply, a power distribution system, and a power consuming device. The power supply and the power distribution system are collectively referred to as a power system which is designed to provide electrical power that meet predetermined design requirements to aircraft electrical systems or equipments.

According to different purposes, the mission device 250 may be divided into a reconnaissance search device, a mapping device, a military dedicated device, a civilian dedicated device, and the like. The mission device 250 may generally include one or more of the following: a photovoltaic platform, a radar, a laser rangefinder, an aerial camera, and the like.

The above embodiment shows a general functional structure of the aircraft, and in other embodiments, the aircraft may further include other functional structures.

Figure 3:
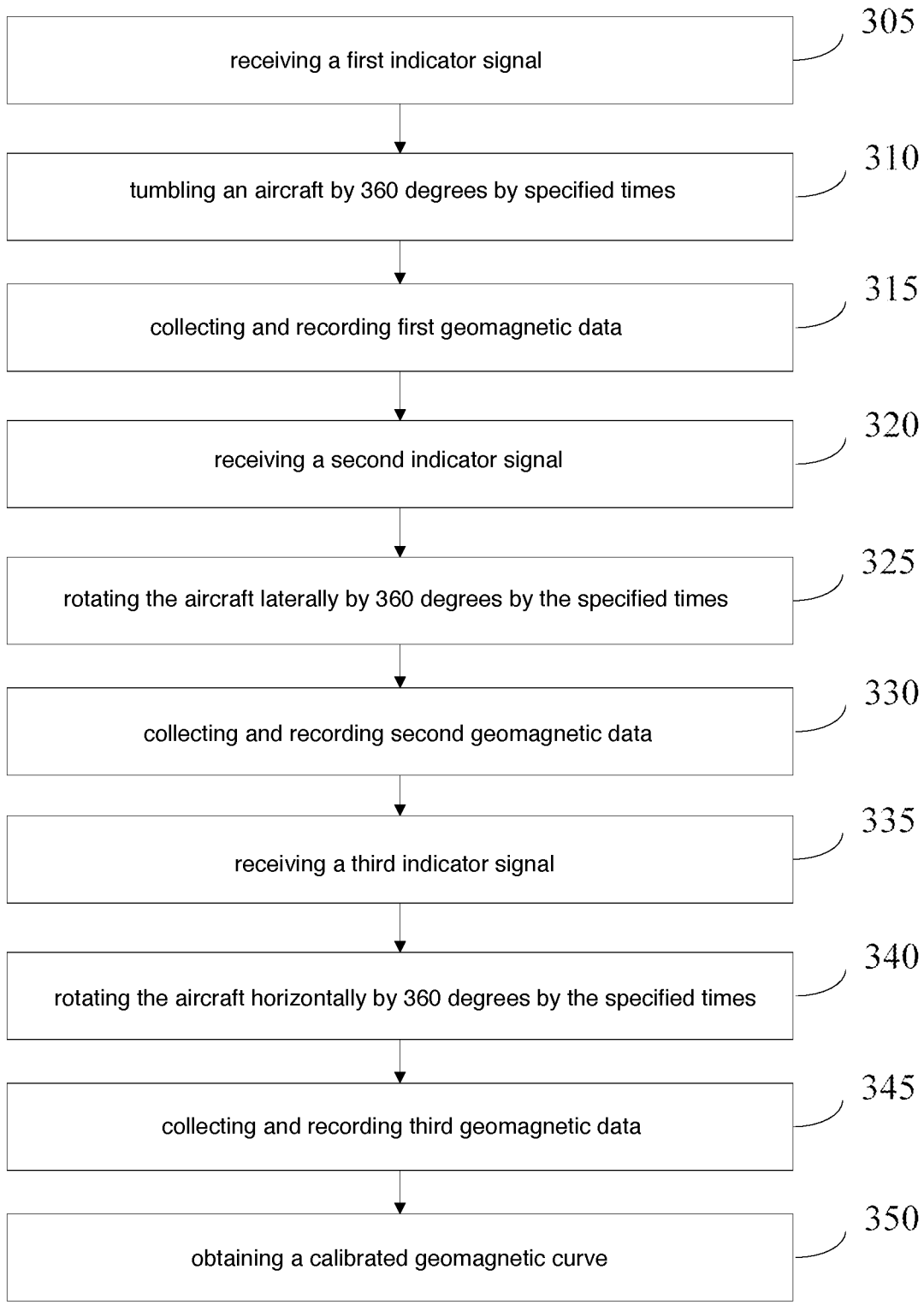
FIG. 3 is a flow chart of a method for calibrating aircraft tri-axial balance according to the embodiment of the present invention.

FIG. 3 is a flow chart of a method 300 for calibrating aircraft tri-axial balance according to the embodiment of the present invention. Accordingly, the method 300 may be implemented, for example, for the geomagnetic sensor in the navigation control device 230 described above.

Step 305): receiving a first indicator signal; wherein the first indicator signal comprises a light signal, a voice prompt, or a text prompt according to the embodiment;

Step 310): tumbling an aircraft by 360 degrees by specified times according to the first indicator signal; wherein the specified times are no less than twice according to the embodiment;

Step 315): collecting and recording first geomagnetic data; wherein the first geomagnetic data comprises a maximum magnetic field intensity and a minimum magnetic field intensity of a first axis (for example, a Z-axis of a cartesian coordinate system);

Step 320): receiving a second indicator signal; wherein the second indicator signal comprises a light signal, a voice prompt, or a text prompt according to the embodiment;

Step 325): rotating the aircraft laterally by 360 degrees by the specified times according to the second indicator signal; wherein the specified times are no less than twice according to the embodiment;

Step 330): collecting and recording second geomagnetic data; wherein the first geomagnetic data comprises a maximum magnetic field intensity and a minimum magnetic field intensity of a second axis (for example, an X-axis of a cartesian coordinate system);

Step 335): receiving a third indicator signal; wherein the third indicator signal comprises a light signal, a voice prompt, or a text prompt according to the embodiment;

Step 340): rotating the aircraft horizontally by 360 degrees by the specified times according to the third indicator signal; wherein the specified times are no less than twice according to the embodiment;

Step 345): collecting and recording third geomagnetic data; wherein the first geomagnetic data comprises a maximum magnetic field intensity and a minimum magnetic field intensity of a third axis (for example, a Y-axis of a cartesian coordinate system); and Step 350): obtaining a calibrated geomagnetic curve according to the first geomagnetic data, the second geomagnetic data and the third geomagnetic data by, for example, fitting the first geomagnetic data, the second geomagnetic data and the third geomagnetic data by an ellipsoid fitting method.

A purpose of rotating twice or more in a same direction in the above steps is to obtain more accurate geomagnetic data, so as to avoid introducing unnecessary errors in calculation.

The above shows an example flowchart of a method of a controlling terminal according to the present invention. It should be noted that the ordinal numbers "first," "second," and "third" used above are merely for the purpose of distinction, and are not intended to imply an order limitation on the content as modified. Although the methods provided herein are shown and described as a series of acts or events, the present invention is not limited by the ordering of such acts or events illustrated. For example, some acts may occur in other sequences and/or concurrently with other acts or events than those shown and/or described. In addition, not all of the illustrated actions are needed. The calibration method provided herein may also include additional actions, such as calibration of other dimensions.

Figure 4:
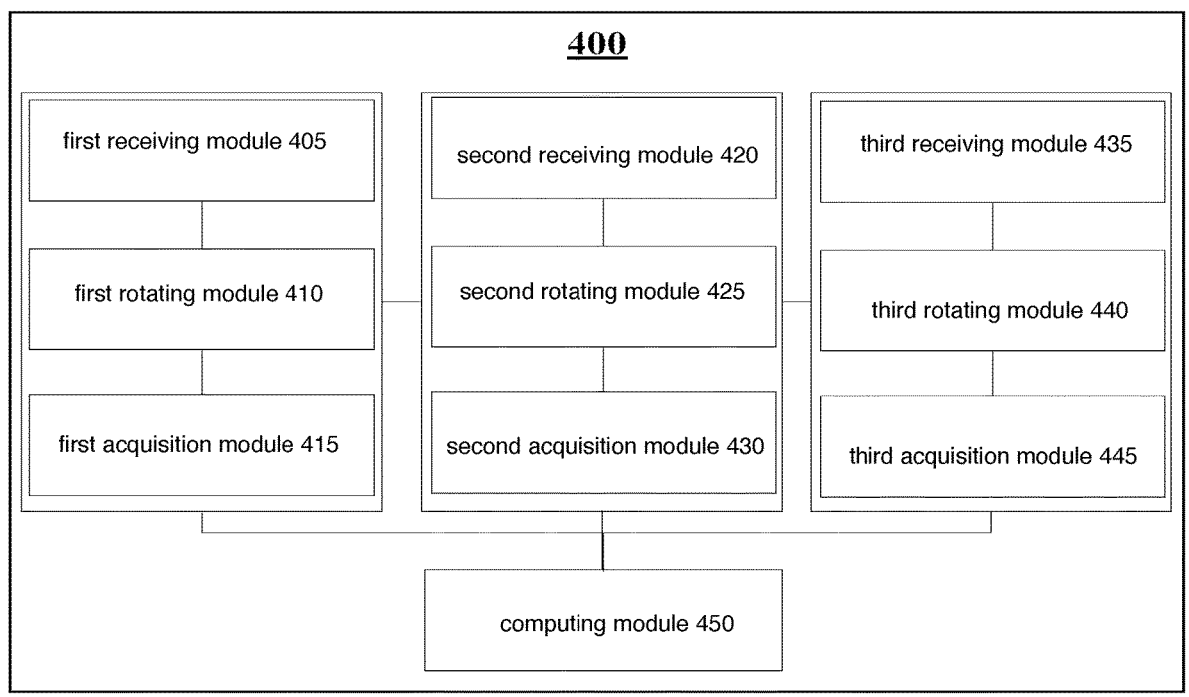
FIG. 4 is a simplified block diagram of a device for calibrating the aircraft tri-axial balance according to the embodiment of the present invention.

FIG. 4 is a simplified block diagram of a device 400 for calibrating the aircraft tri-axial balance according to the embodiment of the present invention. The device 400 according to the present invention is able to calibration of an aircraft (such as the quadrotor 100 shown in FIG. 1 and the aircraft 200 shown in FIG. 2). Referring to FIG. 4, the device 400 comprises: a first receiving module 405, a first rotating module 410, a first acquisition module 415, a second receiving module 420, a second rotating module 425, a second acquisition module 430, a third receiving module 435, a third rotating module 440, a third acquisition module 445, and a computing module 450. In the embodiment, the above modules are connected to and communicate with each other.

In the embodiment, the first receiving module 405 is for receiving a first indicator signal; wherein the first indicator signal comprises a light signal, a voice prompt, or a text prompt.

In the embodiment, the first rotating module 410 is for tumbling an aircraft by 360 degrees by specified times according to the first indicator signal; wherein the specified times are no less than twice.

In the embodiment, the first acquisition module 415 is for collecting and recording first geomagnetic data; wherein the first geomagnetic data comprises a maximum magnetic field intensity and a minimum magnetic field intensity of a first axis (for example, a Z-axis of a cartesian coordinate system).

In the embodiment, the second receiving module 420 is for receiving a second indicator signal; wherein the second indicator signal comprises a light signal, a voice prompt, or a text prompt.

In the embodiment, a second rotating module 425 is for rotating the aircraft laterally by 360 degrees by the specified times according to the second indicator signal; wherein the specified times are no less than twice.

In the embodiment, the second acquisition module 430 is for collecting and recording second geomagnetic data; wherein the first geomagnetic data comprises a maximum magnetic field intensity and a minimum magnetic field intensity of a second axis (for example, an X-axis of a cartesian coordinate system).

In the embodiment, the third receiving module 435 is for receiving a third indicator signal; wherein the third indicator signal comprises a light signal, a voice prompt, or a text prompt.

In the embodiment, the third rotating module 440 is for rotating the aircraft horizontally by 360 degrees by the specified times according to the third indicator signal; wherein the specified times are no less than twice.

In the embodiment, the third acquisition module 445 is for collecting and recording third geomagnetic data; wherein the first geomagnetic data comprises a maximum magnetic field intensity and a minimum magnetic field intensity of a third axis (for example, a Y-axis of a cartesian coordinate system); and In the embodiment, the computing module 450 is for obtaining a calibrated geomagnetic curve according to the first geomagnetic data, the second geomagnetic data and the third geomagnetic data by, for example, fitting the first geomagnetic data, the second geomagnetic data and the third geomagnetic data by an ellipsoid fitting method.

The embodiment of the device 400 for calibrating the aircraft tri-axial balance of the present invention is shown above. It should be noted that while the device provided herein is shown and described as including multiple modules, the present invention may include more or fewer modules depending on the requirements of the implemented functions. An exemplary controlling terminal may include logic or multiple components, modules, and circuitries or mechanisms, or may be operated on logic or multiple components, modules, and circuitries or mechanisms. The modules and circuits are tangible entities (i.e. hardware) that can perform specified operations and can be configured or arranged in some manner. In the embodiment, the circuit may be arranged (i.e. internally or relative to an external entity, such as other circuitry) in a specified manner as a circuitry. In the embodiment, the entirety or portion of one or more computer systems (i.e. a stand-alone client or server computer system) or one or more hardware processors may be implemented by firmware or software (i.e. instructions, application portions, or applications) as a circuitry that is configured to perform specified operations.

The method and the device for calibrating the aircraft tri-axial balance according to an embodiment of the present invention are able to fully calibrate geomagnetic sensors of the aircraft and better eliminate interference of the geomagnetic sensors during flight of the aircraft, making the flight of the aircraft more stable.

In some embodiments, the method and the device for calibrating the aircraft tri-axial balance of the present invention may be implemented as a software program stored on a machine-readable medium. As used in the present invention, a machine-readable medium may store, encode, or carry instructions for being executed by a machine, or form various modules of the quadrotor 100 or the aircraft 200, which causes the quadrotor 100 or the aircraft 200 to perform any one of the embodiments of the present invention. The machine-readable media may include but not be limited to solid state memory, as well as optical and magnetic media. Specifically, the machine-readable medium may include nonvolatile storages such as semiconductor memory devices (i.e. electrically programmable read only memory (EPROM), electrically erasable programmable read only memory (EEPROM)), and flash memory devices; magnetic disks such as internal hard disks and removable disks; magneto-optical disks; random access memories (RAM); and CD-ROM disks as well as DVD-ROM disks.

The foregoing is merely an example of a specific application of the method for calibrating aircraft tri-axial balance of the present invention. It should be understood that any suitable adaptations, modifications, replacements, improvements, and the like that do not depart from the spirit and scope of the present invention should be considered as falling within the scope of the present invention.

Although the present invention has been described with reference to the exemplary embodiments, it should be understood that the present invention is not limited to the structures and methods of the above embodiments. On the contrary, the present invention is intended to cover various modifications and equivalent arrangements. In addition, while the various elements and method steps of the present invention are shown in various combinations and configurations, other combinations, including more or less elements or methods, are also within the scope of the present invention.

What is claimed is:

1. A method for calibrating aircraft tri-axial balance, comprising steps of:
   receiving a first indicator signal;
   tumbling an aircraft by 360 degrees by specified times according to the first indicator signal;
   collecting and recording first geomagnetic data;
   receiving a second indicator signal;
   rotating the aircraft laterally by 360 degrees by the specified times according to the second indicator signal;
   collecting and recording second geomagnetic data;
   receiving a third indicator signal;
   rotating the aircraft horizontally by 360 degrees by the specified times according to the third indicator signal;
   collecting and recording third geomagnetic data; and
   obtaining a calibrated geomagnetic curve according to the first geomagnetic data, the second geomagnetic data and the third geomagnetic data.

2. The method, as recited in claim 1, wherein obtaining the calibrated geomagnetic curve comprises a step of fitting the first geomagnetic data, the second geomagnetic data and the third geomagnetic data by an ellipsoid fitting method.

3. The method, as recited in claim 1, wherein the specified times are no less than twice.

4. The method, as recited in claim 1, wherein the first geomagnetic data comprises a maximum magnetic field intensity and a minimum magnetic field intensity along a corresponding direction of the first geomagnetic data; the second geomagnetic data comprises a maximum magnetic field intensity and a minimum magnetic field intensity along a corresponding direction of the second geomagnetic data; the third geomagnetic data comprises a maximum magnetic field intensity and a minimum magnetic field intensity along a corresponding direction of the third geomagnetic data.

5. The method, as recited in claim 1, wherein the first indicator signal comprises a light signal, a voice prompt, or a text prompt; the second indicator signal comprises a light signal, a voice prompt, or a text prompt; the third indicator signal comprises a light signal, a voice prompt, or a text prompt.

6. A device for calibrating aircraft tri-axial balance, comprising:
   a first receiving module for receiving a first indicator signal;
   a first rotating module for tumbling an aircraft by 360 degrees by specified times according to the first indicator signal;
   a first acquisition module for collecting and recording first geomagnetic data;
   a second receiving module for receiving a second indicator signal;
   a second rotating module for rotating the aircraft laterally by 360 degrees by the specified times according to the second indicator signal;
   a second acquisition module for collecting and recording second geomagnetic data;
   a third receiving module for receiving a third indicator signal;
   a third rotating module for rotating the aircraft horizontally by 360 degrees by the specified times according to the third indicator signal;
   a third acquisition module for collecting and recording third geomagnetic data; and
   a computing module for obtaining a calibrated geomagnetic curve according to the first geomagnetic data, the second geomagnetic data and the third geomagnetic data.

7. The device, as recited in claim 6, wherein the computing module obtains the calibrated geomagnetic curve by fitting the first geomagnetic data, the second geomagnetic data and the third geomagnetic data by an ellipsoid fitting method.

8. The device, as recited in claim 6, wherein the specified times are no less than twice.

9. The device, as recited in claim 6, wherein the first geomagnetic data comprises a maximum magnetic field intensity and a minimum magnetic field intensity along a corresponding direction of the first geomagnetic data; the second geomagnetic data comprises a maximum magnetic field intensity and a minimum magnetic field intensity along a corresponding direction of the second geomagnetic data; the third geomagnetic data comprises a maximum magnetic field intensity and a minimum magnetic field intensity along a corresponding direction of the third geomagnetic data.

10. A device for calibrating aircraft tri-axial balance, comprising:
    a processor; and
    a storage with instructions to be executed by the processor;
    wherein the instructions to be executed by the processor comprises:
    receiving a first indicator signal;
    tumbling an aircraft by 360 degrees by specified times according to the first indicator signal;
    collecting and recording first geomagnetic data;
    receiving a second indicator signal;
    rotating the aircraft laterally by 360 degrees by the specified times according to the second indicator signal;

collecting and recording second geomagnetic data;
receiving a third indicator signal;
rotating the aircraft horizontally by 360 degrees by the specified times according to the third indicator signal;
collecting and recording third geomagnetic data; and
obtaining a calibrated geomagnetic curve according to the first geomagnetic data, the second geomagnetic data and the third geomagnetic data.

\* \* \* \* \*